June 4, 1968 LC JAMES KINGSBURY ET AL 3,386,744

PHONOGRAPH ADAPTOR

Filed Jan. 3, 1966 3 Sheets-Sheet 1

INVENTORS:
LC JAMES KINGSBURY
ROY DALLY
BY Thomas A. Briody
THEIR ATTORNEY

INVENTORS:
LC JAMES KINGSBURY
ROY DALLY
BY Thomas A. Briody
THEIR ATTORNEY

PHONOGRAPH ADAPTOR

Filed Jan. 3, 1966 3 Sheets-Sheet 3

INVENTORS:
LC JAMES KINGSBURY
ROY DALLY
BY Thomas A. Briody
THEIR ATTORNEY

United States Patent Office 3,386,744

Patented June 4, 1968

3,386,744

PHONOGRAPH ADAPTOR

L C James Kingsbury, Decatur, and Roy Dally, Warrensburg, Ill., assignors to General Electric Company, a corporation of New York Filed Jan. 3, 1966, Ser. No. 518,356
7 Claims. (Cl. 274—39)

ABSTRACT OF THE DISCLOSURE

An attachment for phonographs with velocity trip mechanisms to enable the play of relatively small diameter records by means of the conventional phonograph tone arm. This adaptor includes a bracket that supports a rotatably mounted secondary turntable. The bracket is fastened to a non-rotatable spindle on a phonograph turntable and positions the secondary turntable in offset relationship to the first turntable for operation in conjunction with the conventional tone arm. A resilient element rotatably mounted on the bracket is driven by the first turntable and drives the second turntable in response to rotation of the first turntable.

This invention relates to an improved phonograph, and in particular to phonographs wherein a record player is utilized for playing disc-type records.

In an automatic record player that is capable of playing in sequence a series of stacked records, it is necessary to provide an efficient mechanism for initiating a record changing cycle at the end of the program on each record side. This mechanism is usually responsive to movement of the stylus in a "fast inner groove" of the finished record, and it actuates the tone arm up and away from the finished record and toward its starting position, so that the next record may be appropriately dropped on the turntable at the end of each record playing cycle. Such a mechanism is often referred to in presently used automatic record players, as the "velocity trip mechanism," since its operation is dependent upon the velocity of movement of the tone arm after it has reached the aforementioned "fast inner groove" of the record.

As a result of their inclusion of the velocity trip mechanism, most automatic record players do not have the capability of playing relatively small records (e.g. the type of record discs of 3 inch to 4 inch diameter which are used in embossed type recording and reproducing). Thus, for example, when a record disc of between three and four inches in diameter is placed on the turntable of most presently used automatic record players, due to the design of the velocity trip mechanism, the tone arm will not play any or all of the program information on such record.

Accordingly, it is an important object of the present invention to provide an improved phonograph having an automatic record player which may be readily adapted to play relatively small records.

It is another object of this invention to provide an improved adaptor mechanism for an automatic record player which enables the player to reproduce programmed information contained on disc type records adjacent the spindle positioning apertures thereof.

It is a further object of our invention to provide a simple and efficient means for enhancing the versatility of an automatic record player.

A still further object of this invention is to provide an improved adaptor mechanism for an automatic record player, that may be manufactured at a very economical cost.

In carrying out the present invention, in one form thereof, there is provided an automatic record player having a record turntable and a record-centering spindle extending upwardly therefrom. The turntable is driven by a motor. A sound reproducing arm is arranged for horizontal and vertical movement to replay a record positioned on and driven by said turntable. With such an arrangement, a support is removably coupled to the spindle. This support has rotatably mounted thereon, a resilient element and a secondary turntable. When the support is connected to the spindle, the resilient element engages the first turntable and is driven thereby. This resilient element also engages the secondary turntable and drives this last-mentioned turntable, thereby to transmit rotary motion from the first turntable to the secondary turntable for playing a record positioned thereon. The secondary turntable is located relative to the first turntable in such a manner that the sound reproducing arm is capable of playing a record positioned on either of said turntables. With such an arrangement, the automatic record player may readily play relatively large or very small records. An adaptation of a conventional automatic record player has been provided which significantly enhances its record playing versatility.

By further aspects of the present invention, additional desirable features may be included in the record playing device, and the specification concludes with claims particularly pointing out and distinctly claiming the subject matter which we regard as our invention. The invention, however, as to organization and method of operation, together with further objects and advantages thereof, may best be understood by reference to the following description when taken in conjunction with the accompanying drawings, in which:

Figure 1:
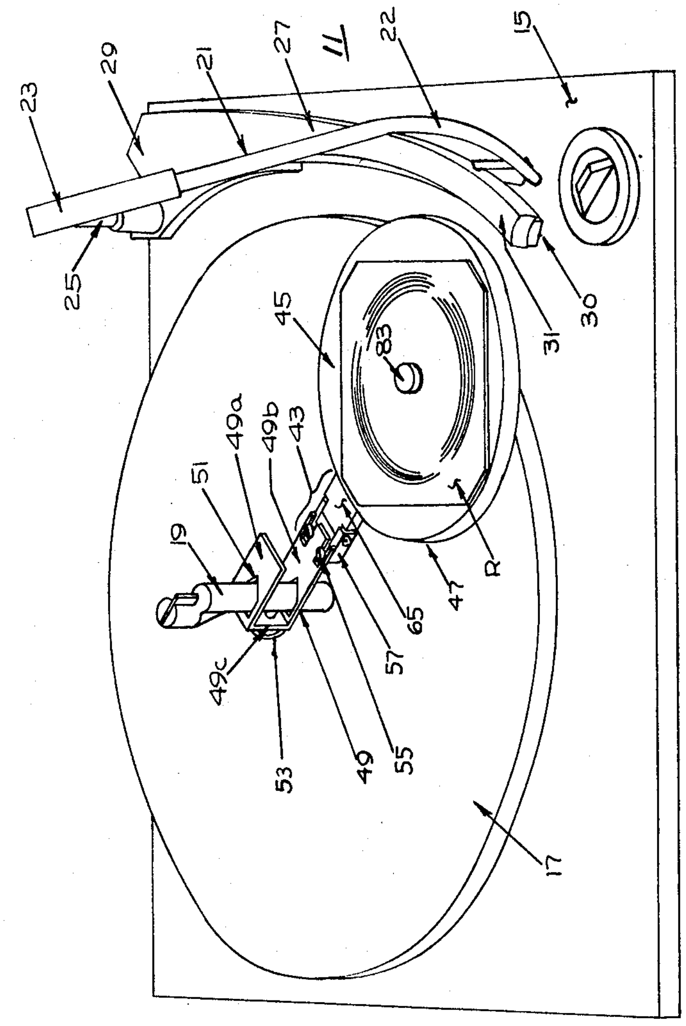
FIG. 1 is a fragmentary perspective view of a phonograph record player employing a preferred embodiment of our invention.

Referring first to FIG. 1, as shown therein we have provided a record player 11 comprising a record player frame 15 mounted on a base (not shown), and a standard sized turntable 17 (e.g. approximately twelve inches diameter) carried upon the frame 15. For centering records, positioning and sequencing them in the desired relationship with turntable 17, a spindle 19 is extended upwardly from turntable 17 in the usual maner. It should be noted that spindle 19, like most prior art spindles for automatic phonographs, does not rotate with the turntable 17.

The record player 11 shown is an automatic record changer type, and employs a record balancing arm 21. The arm 21 is arranged, in general, parallel to the turntable 17, and it is carried by attachment of its rear end 23 to a vertical post member 25. Post member 25 is rotatably journalled and may be raised and lowered, in the usual fashion. The balancing arm 21 is thus arranged on the record player 11 so that it may be raised and lowered, and it is swingable sideways from its raised position for loading records upon spindle 19. More particularly, for loading records on the spindle 19, the balancing arm 21 may be raised and swung angularly from a position wherein its free end 22 generally overlies the spindle 19 to a position wherein its free end is adjacent to but spaced outwardly from the periphery of a record which is to be loaded. The balancing arm 21 may then be located in a detented position, such as where it is shown in FIG. 1, to allow clearance for a record to be loaded upon spindle 19.

A tone arm 27 is located alongside of and above turntable 17, and is provided with a pivotal support near its rear end 29, in the well known manner. The arm 27 is pivotally supported so that vertical and horizontal movement is permitted and a pickup stylus or needle 30 located at the front end 31 of the arm can engage and reproduce sound signals from the groove of a phonograph record placed on the turntable 17.

With the record player thus far described, as is well known in the art, there is provided a velocity trip mechanism (not shown) which actuates the tone arm to recycle or go back to its "standby" position for droppage of the "on-deck" record, at the end of the program on each record. Such a mechanism causes the tone arm 27 to recycle itself (i.e. move up and then laterally back towards its "standby" position when it reaches a radial distance of between 1.87 inches and 2.37 inches from the axis of rotation of the turntable).

To enable the automatic record player 11 to effectively play relatively small disc type records, or records having grooved information located less than 2.37 inches from the axis of rotation of the record, an important aspect of this invention is the provision of adaptor mechanism 41. Essentially, the adaptor mechanism 41 includes a supporting assembly 43 removably connected to spindle 19, a relatively small turntable 45 journalled for rotation on the supporting assembly 43, and a rotatable resilient wheel 47 which serves to drive the small turntable 45 in response to rotary movement of either main turntable 17 or a record (not shown) placed thereon.

Figure 2:
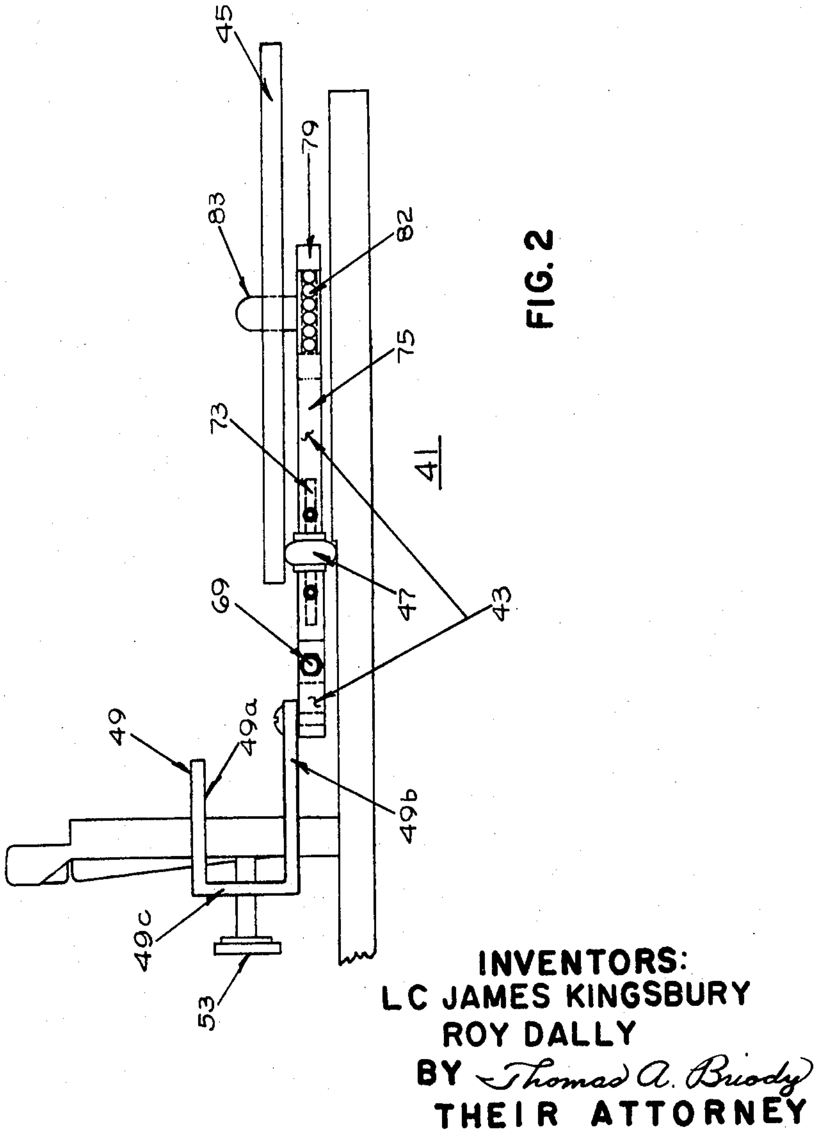
FIG. 2 is a front elevation view of the removable adaptor unit of the record player shown in FIG. 1.

As shown more specifically in FIGS. 1 and 2, the supporting assembly 43 of adaptor mechanism 41 includes a generally U-shaped clamping element 49 which has a slot 51 formed in each of its arms *49a*, *49b*. The slots 51 are suitably configured to securely accommodate the reception of spindle 19, and a screw 53 is in threaded engagement with bight portion *49c* of the clamping element 49, and engages spindle 19 to securely engage element 49 therewith.

Figure 3:
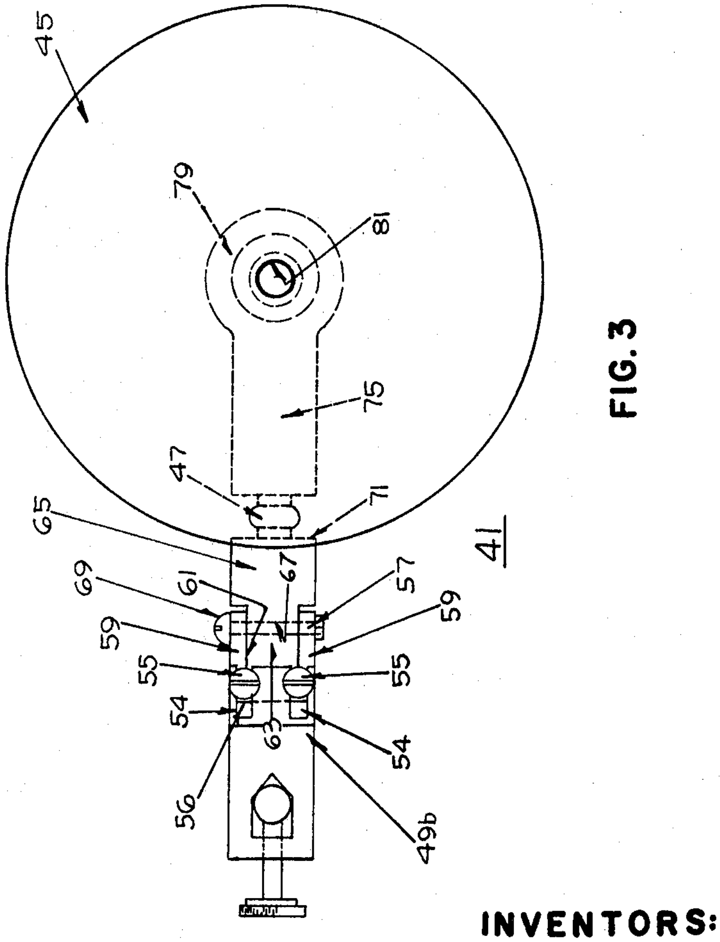
FIG. 3 is a top view of the removable adaptor unit of the record player shown in FIG. 1.

The bottom arm *49b* of clamping element 49 is longer than arm *49a*, and it includes a pair of elongated slots 54 formed near the free end of arm *49b*. The slots 54 have screws 55 extended therethrough. These screws 55 are in threaded engagement with bight portion 56 of a first intermediate support element 57. The element 57 also includes opposed arms 59 with a slot 61 therebetween. Slot 61 is dimensioned to receive tongue 63 of a second intermediate element 65 of the supporting assembly 43. More particularly, tongue 63 has a bearing aperture 67 formed therein (FIG. 3) which aligns with the apertures of arms 59 of clamping element 49. A pin 69 is thus extended through the apertured arms 59, and also through tongue 63 of second intermediate element 65 so that element 65 is free to rotate about a horizontal axis relative to the first intermediate element 57. On the other side 71 of second intermediate element 65 from tongue 63, there is formed a recess for receiving one side of bearing pin 73. Pin 73 is arranged as shown in FIG. 2, with its axis in general perpendicularity to pin 69, and with one end embedded in second intermediate element 65. The other end of pin 73 is embedded in a recess formed in turntable support element 75. Rotatably journalled upon pin 73 and disposed in juxtaposition to the adjacent spaced apart ends of second intermediate element 65 and turntable support element 75, there is provided the small rubber tire 47. The tire 47 preferably has a diameter of approximately 0.650 inch, although other tire diameters may also be used advantageously to accomplish the objectives of our invention.

The bearing pin 73 for tire 47 is secured to the left end of element 75, viewing FIG. 2. At the right end of element 75, there is provided a hub portion 79. Hub portion 79 has an accurately formed cylindrical aperture 81 formed therein which faces upwardly and outwardly. Surrounding aperture 81 and also located in hub portion 79 are a plurality of ball bearings 82.

As further shown in FIG. 2, a cylindrical spindle 83 of relatively short length is rotatably journalled in cylindrical aperture 81. The spindle 83 is journalled for rotation about a vertical axis as is also the spindle 19.

Near the top of spindle 83 there is secured thereto the relatively small secondary turntable 45. The illustrated turntable 45 has a diameter of 5.000 inches and has been specifically designed for playing embossed disc type records having a square configuration of approximately 3.250 inches on each side. However, it will be apparent to those skilled in the art that other various sized turntables may be readily designed to achieve the principal objects of our invention.

As further shown in FIG. 1, the record R having a generally square shaped configuration, may be mounted in a suitably configured recess of the turntable 85. In the illustrated embodiment, record R also has a central aperture therein for receiving spindle 83. However, if a recessed turntable 45 is used to accurately position and accommodate record R, then spindle 83 need not be used to position record R.

For the illustrated record player 11, the tire 47 is positioned in the adaptor mechanism 41 so that the bottom thereof receives rotary motion from turntable 17 or a record placed thereon, at a radial distance of 1.750 inches from the axis of rotation of turntable 17. The tire 47 is also positioned in the adaptor mechanism 41 so that the top thereof engages the underside of the secondary turntable 45, at a radial distance of 1.750 inches from the axis of rotation of turntable 45. With such an arrangement, the tire 47 serves to receive driving motion from turntable 17 or a record thereon and to drive turntable 45 at the same angular velocity.

Thus, if $R_1$=radial distance of tire 47 from axis of rotation of turntable 17;

$R_2$=radial distance of tire 47 from axis of rotation of turntable 45;

$N_1$=revolutions per minute of turntable 17;

$N_2$=revolutions per minute of turntable 45;

$V_1$=linear velocity of turntable 17 at tire 47;

$V_2$=linear velocity of turntable 45 at tire 47;

Since $V_1=V_2$ at all times and $$V_1=2\pi N_1R_1$$

$$V_2=2\pi N_2R_2$$

Then, $N_2=N_1R_1/R_2$.

As seen from the above formula for the angular velocity $N_2$ of turntable 45, the angular velocity $N_2$ of the adaptor turntable is directly proportional to the product of the angular velocity of the main turntable and the radial distance of the driving tire from the axis of rotation of the main turntable, and the angular velocity $N_2$ of turntable 45 is inversely proportional to the radial distance of the driving tire from the axis of rotation of the turntable 45. As a result of this, if the screws 55 are loosened in slots 54 to move the small turntable 45, by way of example, one quarter of an inch closer to the axis of rotation of turntable 17, then $R_1$ would become 1.500 inches and $R_2$ would remain 1.750 inches. By applying these values to the above formula $N_2=N_1R_1/R_2$ it will be seen that the angular velocity $N_2$ of turntable 45 would become 6/7 of the angular velocity $N_1$ of turntable 17.

It will be understood by those skilled in the art that the above explained formula for angular velocity of the adaptor turntable is dependent upon maintaining relatively close design tolerances such as (1) in the parallel arrangement of the two turntables, (2) the resilient compression on top and bottom of the driving tire, and (3) the vertical alignment of the tire itself.

It will thus be seen that by means of the present invention, a simple and convenient structure is provided for adjustably varying the angular velocity of the secondary turntable. It will be further realized that the adaptor mechanism of our invention provides a novel, economical, and removable means for enabling a conventional automatic record player to play relatively small records.

While in accordance with the patent statutes, we have described what at present is considered to be the preferred embodiment of our invention, it will be obvious to those skilled in the art that various changes and modifications may be made therein without departing from this invention, and therefore, we aim in the following claims to cover all such equivalent variations as fall within the true spirit and scope of this invention.

What we claim as new and desire to secure by Letters Patent of the United States is:

1. For use with a phonograph apparatus that includes a first rotating turntable, a velocity trip mechanism, a sound reproducing arm and a record positioning spindle, a turntable adaptor assembly comprising a secondary turntable, a support for positioning said secondary turntable in offset relationship to said first turntable for reproduction by said sound reproducing arm of records positioned on said secondary turntable, the amount of offset being such that records on said second turntable may be reproduced without activation of said velocity trip mechanism, said second turntable being mounted on said support for rotation relative thereto, and a driven element rotatably mounted on said support, said driven element being engageable with said rotating turntable and driven thereby, said driven element being also engageable with said secondary turntable, and driving said secondary turntable in response to rotation of said first mentioned turntable.

2. The arrangement set forth in claim 1 wherein the driven element is a rotatably journalled resilient annulus.

3. The arrangement of claim 2 wherein the resilient annulus is positioned the same distance from the axis of rotation of said first mentioned turntable as the distance of the resilient annulus from the axis of rotation of the secondary turntable, thereby enabling said secondary turntable to rotate at the same angular velocity as said first mentioned turntable.

4. The arrangement of claim 1 wherein the second support of said adaptor assembly is removably clamped to said record positioning spindle.

5. The arrangement of claim 4 wherein said second support includes an adjustable means for varying the angular velocity of the secondary turntable with respect to the velocity of the first mentioned turntable.

6. The arrangement of claim 1 wherein said sound reproducing arm is pivotable about a vertical axis and may be selectively arranged to reproduce sound from records positioned on either one of said turntables.

7. In a phonograph apparatus including a first support, a non-rotating record positioning spindle, a first turntable arranged for rotary movement on said support about said spindle, means for driving said first turntable at a predetermined speed of rotation, a sound reproducing arm arranged to reproduce sound from records positioned on said first turntable, a velocity trip mechanism, a second turntable, a second support fastened into engagement with said spindle for positioning said second turntable in offset relationship to said first turntable for reproduction by said sound reproducing arm of records positioned on said second turntable, the amount of offset being such that records on said second turntable may be reproduced without activation of said velocity trip mechanism, said second turntable being mounted on said second support for rotation relative thereto, and means engageable with and driven by said first turntable for rotating said second turntable in respons to rotation of said first turntable.

References Cited

UNITED STATES PATENTS

| | | | |
|---|---|---|---|
| 1,361,718 | 12/1920 | Grey. | |
| 2,335,661 | 11/1943 | Gay | 274—39 |
| 1,369,269 | 2/1921 | Haas. | |

LEONARD FORMAN, *Primary Examiner.*

ROBERT B. HULL, *Examiner.*

JOEL M. FREED, *Assistant Examiner.*